(No Model.)
A. NOTEMAN.
BICYCLE LOCK.
No. 548,888.  Patented Oct. 29, 1895.
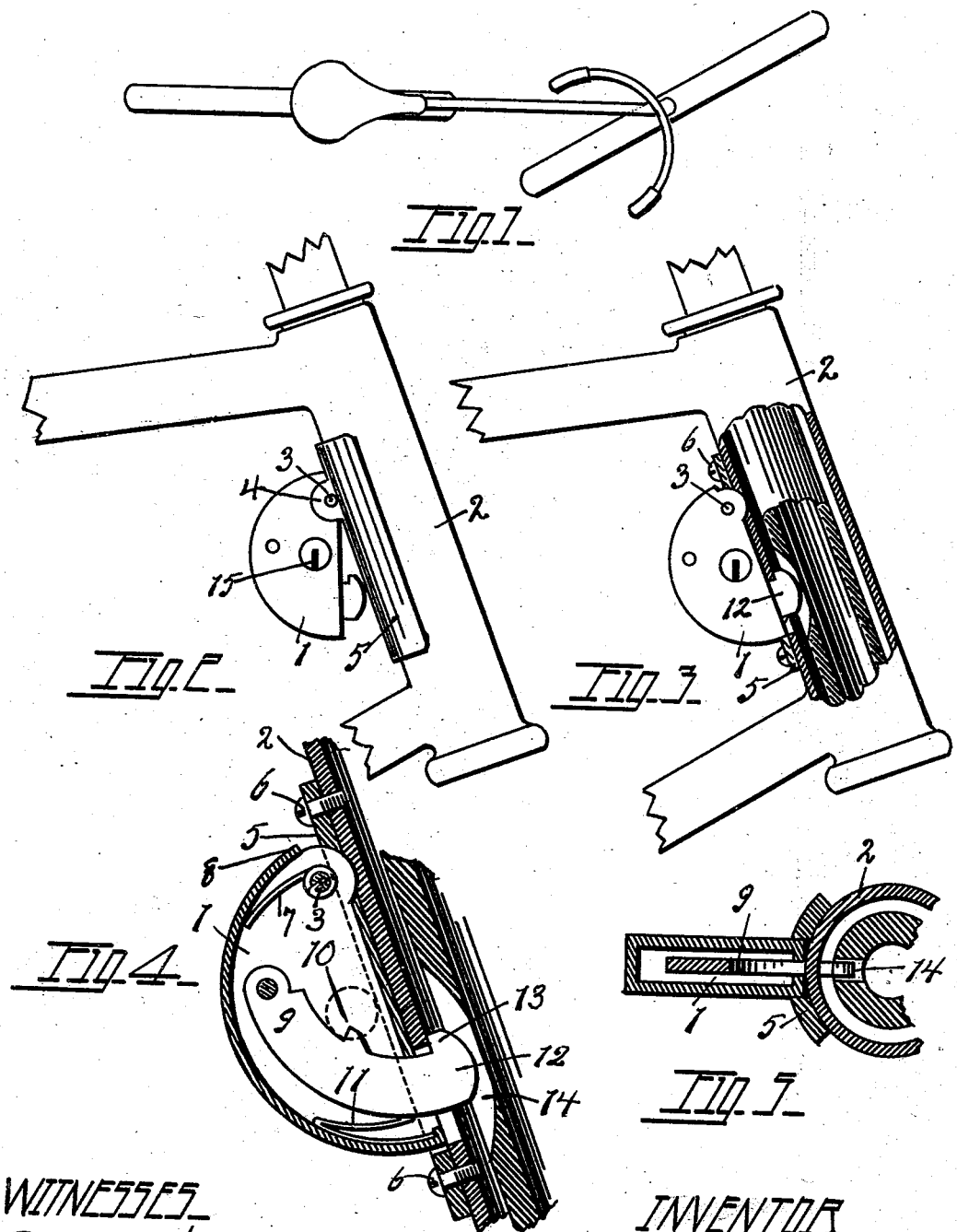
WITNESSES
Carl H. Keller.
Maud Schumacher.
INVENTOR
Alonzo Noteman
By William Webster
Atty

UNITED STATES PATENT OFFICE.

ALONZO NOTEMAN, OF TOLEDO, OHIO, ASSIGNOR OF ONE-HALF TO WALTER ECKEL AND I. W. COPELIN, OF SAME PLACE.

BICYCLE-LOCK.

SPECIFICATION forming part of Letters Patent No. 548,888, dated October 29, 1895.

Application filed July 1, 1895. Serial No. 554,524. (No model.)

*To all whom it may concern:*

Be it known that I, ALONZO NOTEMAN, of Toledo, county of Lucas, and State of Ohio, have invented certain new and useful Improvements in Bicycle-Locks; and I do hereby declare that the following is a full, clear, and exact description of the invention, which will enable others skilled in the art to which it appertains to make and use the same, reference being had to the accompanying drawings, and to the numerals of reference marked thereon, which form part of this specification.

My invention relates to a bicycle-lock, and has for its object to provide a lock for securing one wheel at an angle to the other in a manner to cause the bicycle to revolve in the arc of a circle in the attempt of an unauthorized person to propel the same.

A further object is to provide a lock integral with or attachable to the frame of the bicycle with a locking-bolt to pass through the shell of the tubular frame and enter a recess in the steering-post.

With these objects in view my invention consists in the peculiar construction of the several parts and the novel manner of arranging the same, all of which will be fully described, and then specified in the claim.

In the drawings, Figure 1 is a top plan view of a bicycle with the steering-post locked to cause the front wheel to travel in the arc of a circle in accordance with my invention. Fig. 2 is a detail view showing one form of lock applied to the tubular head of the frame. Fig. 3 is a like view with a portion of the tubular head of the frame broken away to show the locking-bolt engaged with the steering-post. Fig. 4 is a sectional detail view showing the interior of the lock and the locking-bolt in engagement with the tubular head of the frame and the steering-post; and Fig. 5 is a transverse section through the lock-case, tubular head of the frame, and steering-post, showing the lock-bolt in engagement with the frame and post.

In carrying out my invention I employ a casing 1, pivotally attached to the tubular head of the frame 2 by means of a pivot-pin 3, passed through ears 4 upon a plate 5, of a contour to nicely fit the head and be secured thereon by screws 6. It will be apparent that in new constructions the plate 5 may be omitted by simply forming ears upon the tubing, and in attaching the lock upon wheels already constructed the plate may be secured in various ways, as by bands or brazing, thereby dispensing with screws 6.

Upon pin 3 is secured one end of a spring 7, the other end bearing against the inner side of the casing to normally press the edge 8 against the plate 5 to avoid rattling when the lock is in an unlocked position, as in Fig. 2.

Pivoted within the casing is a locking-bolt 9, urged against a tumbler 10 by a spring 11 and formed with a projecting end 12, having a catch 13, which engages with the tubular head when locked and projects beyond the inner diameter of the tubular head to engage with the steering-post when the recess 14 therein is coincident with the bolt.

Recess 14 of the steering-head is formed in one side, more or less out of a straight line with the front thereof when the wheels are in line, thereby requiring a sufficient turn of the steering-post to lock the same to cause the front wheel to travel at a tangent to the rear wheel.

The locking-bolt is withdrawn by the revolution of the tumbler through the medium of a key inserted in the keyhole 15.

It will be seen that in the use of the tubular head and steering-post the locking-bolt may be of minimum lightness and yet preclude the possibility of turning the post, and also that when the steering-post is locked, as described, in the attempt to steal the bicycle by propelling the same from a place of storage or when carelessly left upon the street this purpose is defeated by reason of the wheel traveling in the arc of a circle, and thereby returning to the place from which it was attempted to remove it.

What I claim is—

In a bicycle lock, the frame and steering head having slots adapted to coincide, a lock case pivotally attached to the frame, and a locking bolt carried within said case and adapted to be projected into engagement with the slots in the frame and head when said slots coincide.

In testimony that I claim the foregoing as my own I hereby affix my signature in presence of two witnesses.

ALONZO NOTEMAN.

Witnesses:
 WILLIAM WEBSTER,
 PETER J. MEULER.